Figure 11:
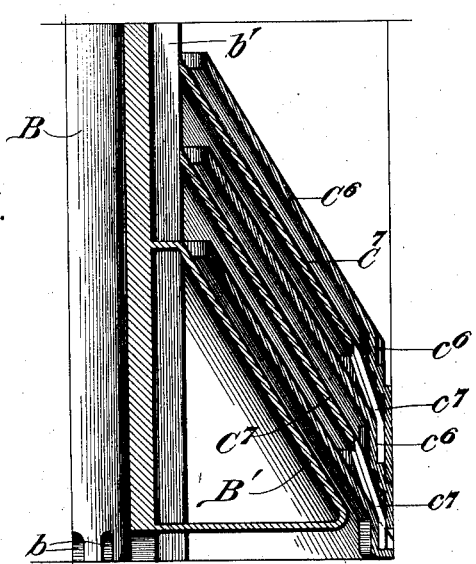

No. 736,977. PATENTED AUG. 25, 1903.
H. B. KEIPER.
CENTRIFUGAL SEPARATOR.
APPLICATION FILED SEPT. 11, 1901.
NO MODEL. 4 SHEETS—SHEET 1.
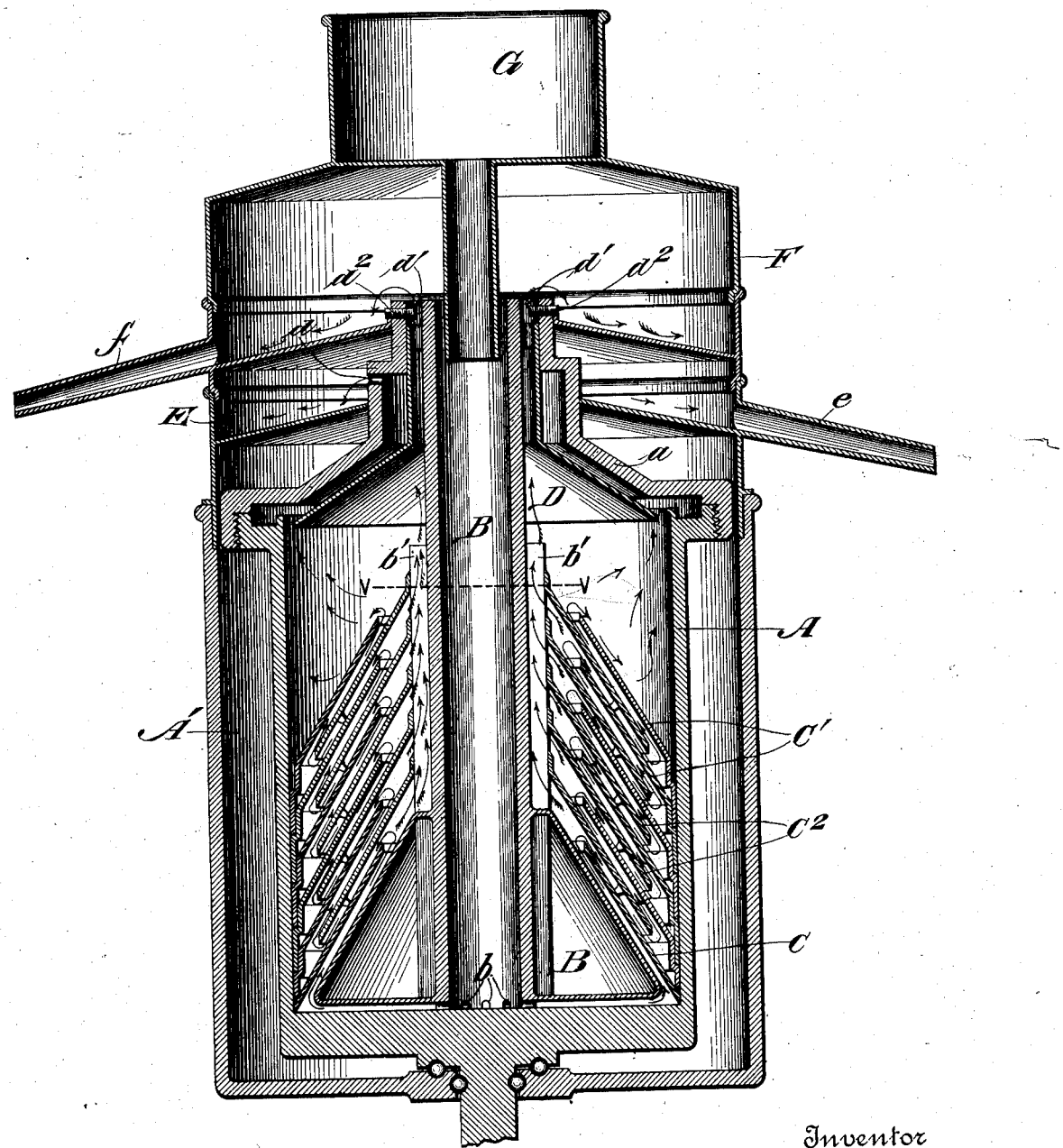

No. 736,977. PATENTED AUG. 25, 1903.
H. B. KEIPER.
CENTRIFUGAL SEPARATOR.
APPLICATION FILED SEPT. 11, 1901.
NO MODEL. 4 SHEETS—SHEET 2.
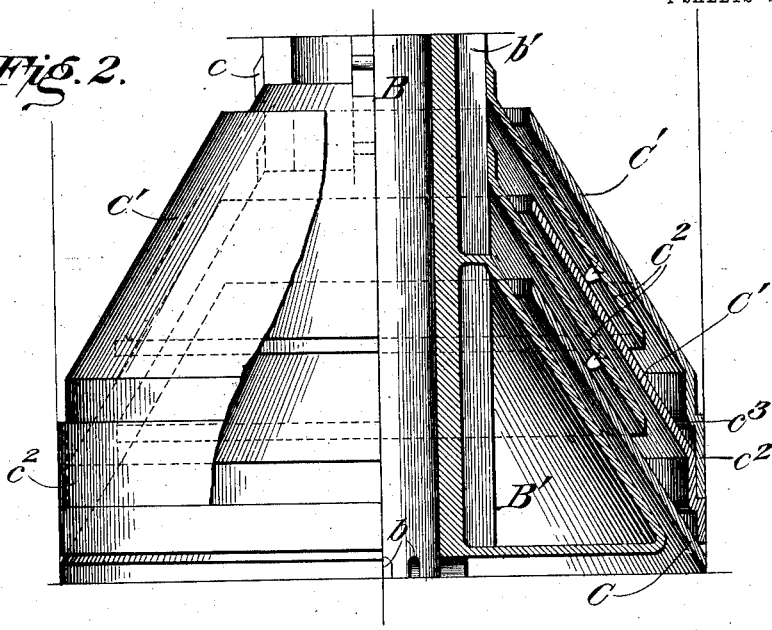
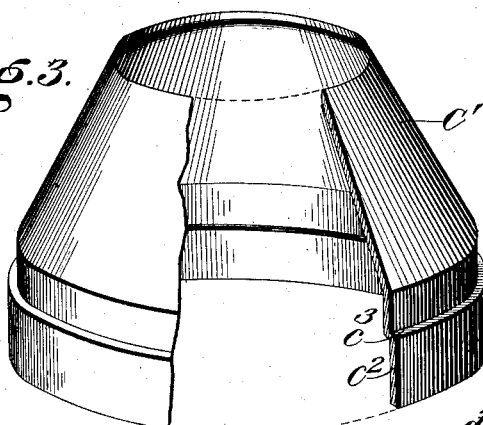
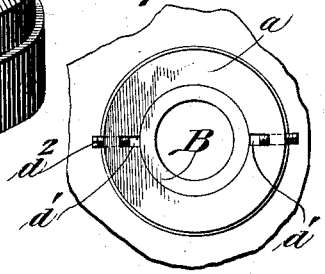
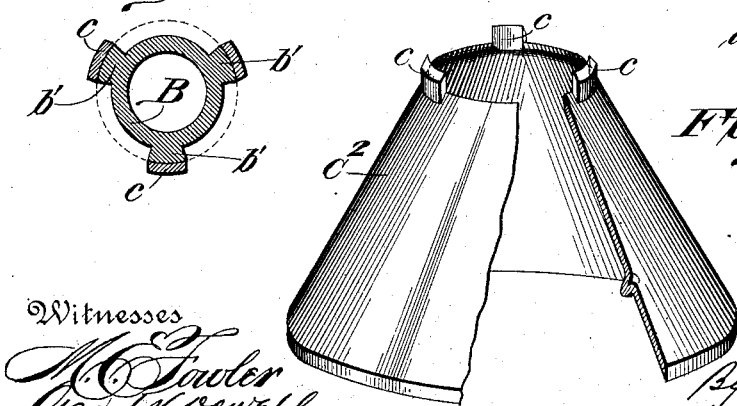
Witnesses
M. C. Fowler
Julian C. Dowell
Inventor
Henry B. Keiper
By Julian C. Dowell
His Attorney
THE NORRIS PETERS CO., PHOTO-LITHO., WASHINGTON, D. C.

No. 736,977. PATENTED AUG. 25, 1903.
H. B. KEIPER.
CENTRIFUGAL SEPARATOR.
APPLICATION FILED SEPT. 11, 1901.
NO MODEL. 4 SHEETS—SHEET 3.
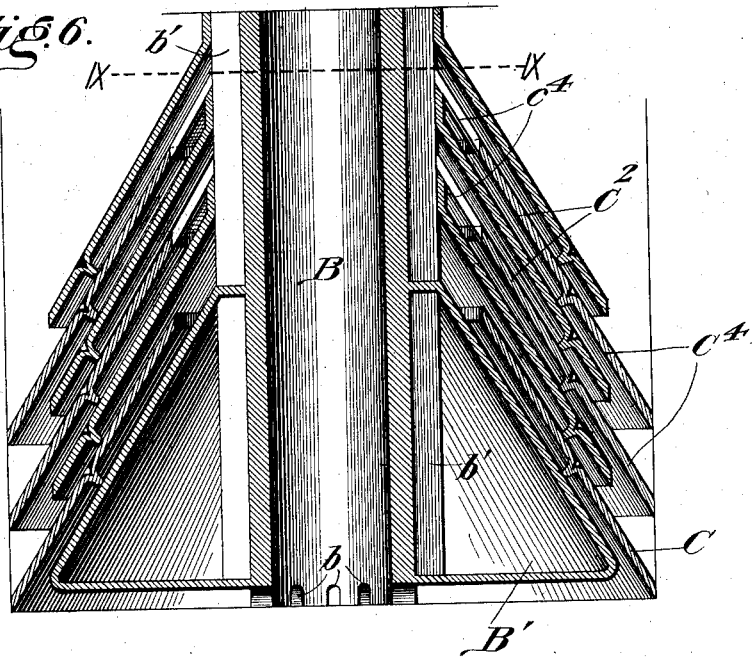
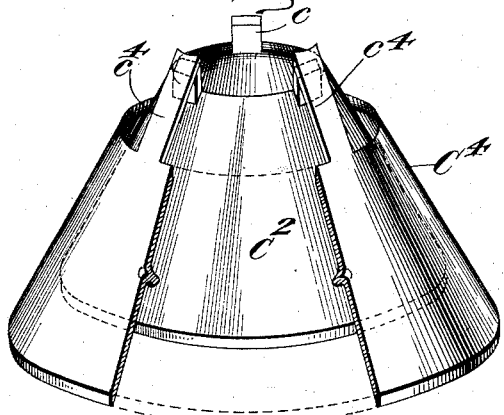
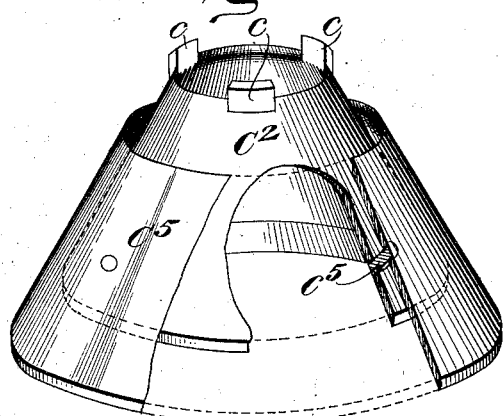
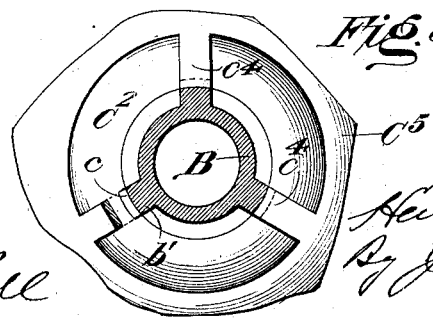
Witnesses
Inventor
Henry B. Keiper
By Julian C. Dowell
His Attorney No. 736,977. PATENTED AUG. 25, 1903.
H. B. KEIPER.
CENTRIFUGAL SEPARATOR.
APPLICATION FILED SEPT. 11, 1901.
NO MODEL. 4 SHEETS—SHEET 4.

Witnesses
M. Fowler
Osgood M. Dowell

Inventor
Harry B. Keiper
By Julian C. Dowell
His Attorney

No. 736,977. Patented August 25, 1903.

UNITED STATES PATENT OFFICE.

HENRY B. KEIPER, OF LANCASTER, PENNSYLVANIA.

CENTRIFUGAL SEPARATOR.

SPECIFICATION forming part of Letters Patent No. 736,977, dated August 25, 1903.

Application filed September 11, 1901. Serial No. 75,090. (No model.)

*To all whom it may concern:*

Be it known that I, HENRY B. KEIPER, a citizen of the United States, residing at Lancaster, in the county of Lancaster and State of Pennsylvania, have invented certain new and useful Improvements in Centrifugal Separators; and I do hereby declare the following to be a full, clear, and exact description of the invention, such as will enable others skilled in the art to which it appertains to make and use the same.

This invention relates to that class of centrifugal machines which are designed for separating intermixed liquids of different densities, notably for separating cream from the more watery constituents of whole milk.

Various centrifugal machines have heretofore been devised employing a series of superimposed rings or partitions, preferably frustums of cones in form, arranged within the liquid-space of the rotating bowl or vessel around a central feed-tube and crossing the radial lines of the bowl, so as to deflect and divide the milk or other liquid under treatment into thin layers and cause a more thorough separation. By reason of the fact that the liquid-space within the bowl is being constantly supplied with fresh milk or other liquid which is necessarily mingled and blended with the partially-separated liquid and owing to the impossibility of preventing the globules of cream or the lighter liquid from being carried outward with the particles of milk or the heavier liquid a more or less incomplete separation results.

The principal object of the present invention is to overcome the above-mentioned objections and to provide a centrifugal machine which will be capable of effecting a thorough separation of the liquid under treatment.

A further object is to provide a machine consisting of a few simple parts, which may be easily assembled or removed and which will be inexpensive in manufacture and efficient and durable in use.

In the accompanying drawings, which form a part of this specification, I have illustrated my invention embodied in a centrifugal creamer, though it will be understood that the invention is applicable to the separation of other liquids and not restricted to the use herein described.

Figure 12:
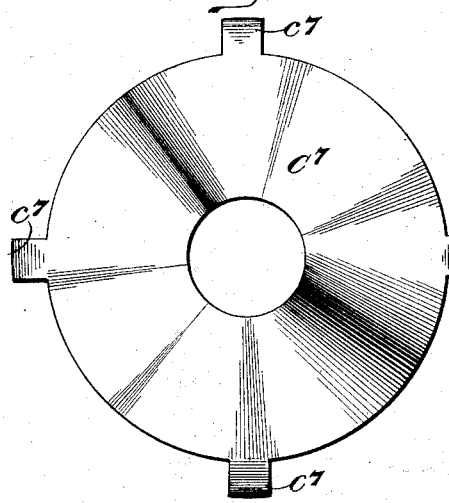
Figure 13:
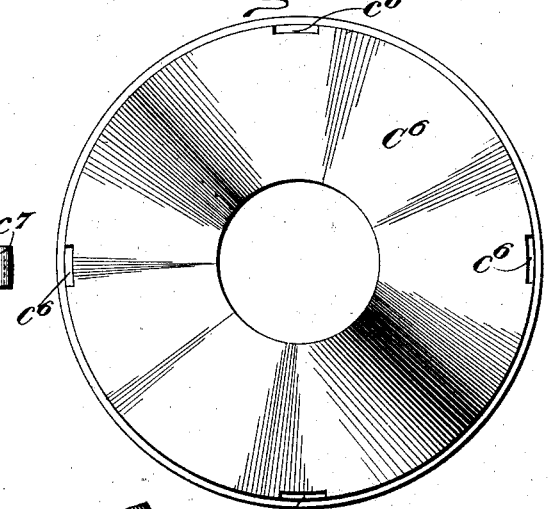
Figure 14:
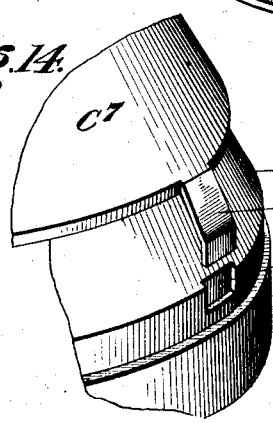

In said drawings, in which corresponding parts in the different views are designated by like letters of reference, Figure 1 is a vertical section of an apparatus embodying a preferred form of my invention. Fig. 2 is a sectional side elevation, on a slightly-enlarged scale, of a portion of the separating devices which occupy the liquid-space of the rotating bowl or liquid-containing vessel. Fig. 3 is a perspective view of one of the "outer" conical partitions or division-plates detached, a portion thereof being broken away, so as to more clearly illustrate its construction. Fig. 4 is a similar view of one of the "inner" conical partitions or division-plates, also partly broken away for the same purpose. Fig. 5 is a detail sectional view on the line 5 5 of Fig. 1. Fig. 6 is a vertical section of a portion of the apparatus, showing a modified form of conical partitions or division-plates. Fig. 7 is a detail perspective view of an adjacent pair of said conical partitions of the form shown in Fig. 6. Fig. 8 is a detail perspective view of another pair of partitions, showing a further modification. Fig. 9 is a detail sectional plan view on the line IX IX of Fig. 6. Fig. 10 is a detail plan view showing the cream-discharge openings. Fig. 11 is a half-section of another modification of the conical partitions or division-rings. Figs. 12 and 13 are plan views of one of the inner and one of the outer partitions, respectively, shown in Fig. 11; and Fig. 14 is a detail fragmentary perspective view of portions of said partitions.

Referring to the drawings by specific letters of reference, A denotes the rotatable bowl, which in the form shown is provided with a detachable dome or cover *a*, secured thereon by engagement of an interiorly-threaded flange with the correspondingly exteriorly threaded upper end of the bowl. An annular groove is formed in the top of the bowl, in which may be placed a suitable packing-ring to provide a fluid-tight joint between the same and the cover.

The letter A' denotes an inclosing casing, on which may be mounted a suitable feed-receptacle for the whole milk and troughs or receptacles to receive the separated cream and skimmed milk, the latter having suitable outlet pipes or spouts for conveying away the separated liquids, as desired. The said receptacles and conduits form no part of the present invention, and further description thereof is deemed unnecessary.

A feed-tube B is centrally disposed within the bowl, said tube preferably having its lower end resting upon the bottom of the bowl and provided with a series of perforations $b$, through which the inflowing whole milk passes into the liquid-separating space, as will be presently explained. The lower end of the pipe B is formed or provided with a conical exterior enlargement B', occupying the lower central portion of the liquid-space, which is more or less inactive in the separating process and where in the usual type of machine the inflowing feed-milk commingles and blends with the partially-separated cream and milk within the bowl. The said enlargement may be either solid or hollow, though preferably the latter for the sake of lightness, and the bottom thereof is flat and slightly separated from the bottom of the bowl lying immediately above the feed-inlet perforations $b$, so as to provide a narrow annular passage from the center to the circumference of the bowl. Surrounding said terminal portion or enlargement of the feed-tube is a conical partition or division-ring C, the interior or lower surface of which is slightly separated from the exterior surface of said portion B', so that only a thin layer of milk can pass between them. Said conical partition or division-ring C is preferably constructed with the opening in its apex or reduced end considerably larger than the inlet-tube passing therethrough and of sufficient size to receive the upper reduced end of the cone B', which extends a short distance beyond said opening. The letters C' C' denote a series of similar conical partitions or division-rings, arranged one above another in the liquid-space of the bowl above the partition C, and which I hereinafter term the "outer" partitions; and $C^2$ $C^2$ denote a series of conical partitions or division-rings, hereinafter termed the "inner" partitions, one of the latter being arranged between each pair of outer partitions. The outer rings or partitions are each preferably of the form shown in Fig. 3, and the inner series are preferably of the form shown in Fig. 4. Lugs or projections $c$ $c$ at the apexes of the inner partitions rest upon a corresponding series of vertically-disposed ribs $b'$ on the feed-tube B, so as to form a tight fit by frictional contact therewith, whereby the parts are held together and in proper position within the separating-space of the bowl. The first or lower inner partition $C^2$ is arranged to underlie the next adjacent superposed partition-plate or ring C', leaving only a narrow flow-passage between the two, and the other superposed partitions or division-rings are similarly arranged to form similar passages, the several partitions being slightly separated and held apart by separating projections or protuberances $c'$ between them, which may be formed by indentations in one partition bearing upon or against another. The enlarged ends or outer peripheries of the partitions or division-rings $C^2$ terminate a short distance from the inner wall of the rotating bowl, while the smaller ends or inner peripheries of the division-rings or partitions C C' terminate a short distance from the central tube or pipe B, whereby the outer rings are caused to overlap and extend beyond the inner rings at their lower ends, while the inner rings extend beyond the outer rings at their upper ends, thus forming a zigzag passage, so that the liquid to be separated is caused to flow alternately outward and inward or from and toward the center, being deflected and returned toward the center by contact with the inner wall of the bowl or the closed spaces at the lower ends of the outer partitions and confined between the opposing surfaces of the adjacent partitions in thin superimposed laminæ, forming a continuous sheet or layer extending from the inlet at the bottom of the bowl or conical base to the outlet at the reduced end of the last partition in the series. By this construction, as will be seen, it is impossible for any whole milk which is being fed into the liquid-space of the bowl to mingle with liquid which has been partially skimmed or separated, and the liquid in the continuously-moving layer is successively skimmed at each return movement from the first to the last turn in its zigzag course through the liquid-space, thereby completely separating the cream-globules from the watery constituents of the milk. The cream passes up the space surrounding the central feed-tube and is discharged through a suitable opening in the cover of the bowl, while the skimmed milk is collected and discharged through an outer or peripheral annular passage at the upper part of the vessel.

The larger ends of the partitions or division-rings C' are preferably formed with annular flanges $c^2$, having offsets or shoulders $c^3$ thereon to provide annular spaces, which receive the pendent flanges $c^2$ of the adjacent superposed division-rings, so that the several division-rings in the series will be secured together and firmly held in place by frictional contact between the annular flanges thereon and the interior wall of the separating-bowl, thereby dispensing with bolts, rivets, or other fastenings, which form obstructions in the flow-passage tending to interfere with or retard the separation.

In the construction shown in Figs. 6 and 7 the outer partitions or division-rings $C^4$ terminate flush with the inner wall of the bowl, so as to form close-fitting joints by frictional contact therewith, and in this instance the reduced ends of the plates are provided with extensions or tongues $c^4$, adapted to bear upon the ribs $b'$ of the tube adjacent to the friction-lugs $c$ $c$ on the inner series of rings and hold said partitions in place, separating protuberances or projections being provided in this instance, as in the former case, so as to hold the plates at relatively fixed distances apart.

In the modification shown in Fig. 8 the peripheral flanges and the extensions or tongues above described are omitted, and the two adjoining partitions $C^2$ and $C^5$ are secured together by rivets $c^5$.

In the construction illustrated in Figs. 10 to 12 the superposed partitions are removably held together by frictional contact between their outer peripheral flanges, as in Fig. 1; but instead of providing lugs or tongues thereon adapted to contact with or impinge upon the centrally-disposed tube, as in the other figures, the outer partitions $C^6$ are indented or recessed, as at $c^6$, preferably at two or more points, to receive tongues or projections $c^7$ on the peripheral flanges of the inner partitions $C^7$, whereby the two series of partitions are removably secured together and held against rotation one upon the other by frictional contact between said peripheral flanges and tongues or projections without any bearing upon or contact with the central tube, thus leaving a free and unobstructed passage around said central tube, which is kept clear by the centrifugal action, so as not to obstruct the upward passage of the cream at the center nor the outward flow of the partially-skimmed milk in the space surrounding the central ascending column of cream.

The letter D denotes a hood or dome having a reduced tubular portion secured within the neck of the bowl and a pendent flaring portion underlying the outer portion of the dome or cover $a$, said hood separating the said skim-milk space from the cream-space within the neck of the bowl. The separated skim-milk, flowing into the space or channel between the hood or dome D and the cover $a$, escapes through the vent-opening $d$ into the trough E, from which it may be conducted by the spout $e$ into any suitable receptacle for the same, while the cream, which passes upward along the exterior of the pipe B, flows through the channel formed between the same and the reduced tubular portion of the hood D and out through one or more vent openings or orifices $d'$, which may be provided with screw-plugs $d^2$ for controlling the discharge of the cream, said plugs being adjustable, so as to increase or diminish the size of the escape-port to regulate the discharge, as may be desired.

The operation of my invention will be readily understood from the foregoing description, taken in connection with the accompanying drawings. The whole milk being fed through the receptacle G enters the separating-space of the bowl through the orifices $b$ at the bottom of the inlet-pipe B and is spread out underneath the widened base of said pipe, forming a thin layer which by the centrifugal force induced by the rotation of the bowl is moved radially outward until its course is deflected by contact with the interior wall of the bowl or with the closed ends of a pair of the partition-plates $C^2$, whereby said layer is caused to ascend the inclined passage between the inclined surfaces of the conical base and overlying partition until it reaches the upper extremity of the latter, at which point a partial separation of the cream-globules will take place, the latter being forced toward the pipe B, while the heavier particles of milk still containing a percentage of cream will be forced down the passage between the next adjacent superposed division or partition $C^2$ and the underlying partition $C'$, and so on throughout the series, the liquid thus taking a zigzag course first from and then toward the center. At each outward deflection or turn a further separation will be effected and the cream-globules forced toward the center, while the heavier particles are forced outward along the under sides of the sloping or inclined partitions until the end of the last passage in the series is reached, whereupon the thoroughly-skimmed milk will pass upward and outward through the channel between the depending dome D and the cover $a$ and escape through the exit port or ports $d$, the cream meanwhile creeping gradually up the exterior surface of the pipe B in the channel or space provided therefor between the vertical ribs $b'$ and thence into the channel between the reduced tubular portion of the dome D and the exterior of said tube and out through one or more exit-ports $d'$. Owing to the centrifugal force induced by the rapidly-rotating drum and the fact that only a thin layer of milk is permitted to pass from the inlet at the lower end of the bowl to the upper end of the separating-space, the accumulation of milk at the center around and about the space for the ascending cream is prevented, and no whole or full milk can enter the liquid-separating space at any point except at the bottom, where it is confined and compelled to ascend in a continuous thin layer, and thus whole or full milk and the partially-skimmed milk throughout the operation are kept separate and apart from the separated cream-globules creeping up the exterior of the tubular feed-pipe, thereby effecting a thorough and practically-complete separation of the cream from the milk in a rapid and effective manner.

I have ascertained by experiment that a thorough separation of the cream will be effected when the thin layer of milk has traveled in its zigzag course over a given number of partitions or division-plates, according to the length thereof and the size of the bowl. In a bowl of the usual size, such as has been employed in separators now in common use, I have found the best results to be produced by such an arrangement as is shown in Fig. 1 of the drawings and that a less effectual separation will result by increasing or decreasing the number of partitions, the number used, however, depending upon the size and form of the plates and bowl. It is therefore expedient in case it is desired to effect a less complete separation of the cream to either add to or subtract from the number of partition-plates shown, which may be easily done by either removing one or more of the upper detachable sections or adding additional sections thereto. My invention is therefore not limited to the use of any given number of partitions or division-rings, and it will also be understood that other changes in the details of construction and arrangement of parts will readily suggest themselves to persons skilled in the art and may be made without departing from the spirit and scope of my invention.

It will be observed that in the construction shown in Figs. 10 to 12 each one of the inner series of partitions or division-rings is sustained between and slightly separated from each two adjacent partitions of the peripherally-connected outer series, thus rendering the interposition of spacing projections or other separating means unnecessary, although either series of partitions may be provided with spacing projections, if desired. It will also be observed that when fitted within the separating-space of the bowl surrounding the central tube B the peripheral portions of the outer series of partitions will be in contact with the inner wall of the bowl, and any tendency toward separation or dislocation of the partitions due to the centrifugal action or force exerted at one side of the apparatus will be exactly counterbalanced by the force or pressure exerted at the other side, and thus the entire series of superposed partitions will be sustained in the desired positions without the use of centering means, such as heretofore employed in separators of this class, in which without centering means the division-rings being less in diameter than the interior diameter of the bowl or drum any undue pressure at one side not counterbalanced by the pressure at the other side will force the partitions toward the interior wall of the bowl, so as to obstruct or close the flow-passage at that side, while enlarging the flow-passage at the other side and disarranging the partitions.

Having thus described my invention, what I claim as new, and desire to secure by Letters Patent of the United States, is—

1. In a centrifugal separator, a rotatable bowl having a central feed-tube and an interiorly-arranged series of superimposed annular partitions encircling said tube, said partitions having their central openings sufficiently larger than the tube to leave a central passage for the cream or lighter separated liquid and being themselves slightly separated to form shallow annular passages between them, said passages having communication at alternate adjacent ends and substantially all the way around the same, whereby the inflowing liquid is forced gradually upward in a thin layer, the heavier liquid flowing successively through said passages alternately from and toward the center of the bowl, and the cream or lighter particles separating and ascending around the feed-tube; substantially as described.

2. In a centrifugal separator, a rotatable bowl having a central feed-tube and a series of superimposed annular partitions encircling said tube and dividing the liquid-separating space of the bowl into narrow annular flow-space, said partitions having central openings sufficiently larger than the tube to leave a central passage for the lighter separated liquid, and the passages between said partitions extending from the periphery of the bowl to said central passage and communicating at alternate adjacent ends; substantially as described.

3. In a centrifugal separator, a rotatable bowl, a central feed-tube, and superimposed conical partitions encircling said tube and slightly separated to form annular passages between them, the central openings of said conical partitions being sufficiently larger than the feed-tube to provide a central passage for the cream or lighter separated liquid, and the passages between said partitions extending from the peripheries of the bowl to said central passage and communicating at alternate adjacent ends whereby the flow of liquid is directed alternately from and toward the center of the bowl in a generally ascending thin layer; substantially as described.

4. In a centrifugal separator, a rotatable bowl, a central feed-tube, an interiorly-arranged series of annular partitions encircling said tube and extending across the radial lines of the bowl, the outer peripheries of alternate partitions beginning at the interior wall of the bowl, and the outer peripheries of the intermediate partitions beginning at a suitable distance therefrom, so as to provide a continuous zigzag passage for the liquid through the spaces between the partitions; substantially as described.

5. In a centrifugal separator, a rotatable bowl, a central feed-tube therein, and a series of superimposed annular partitions encircling said tube and arranged within the liquid-space across the radial lines of the bowl, the outer peripheries of alternate partitions extending beyond the intermediate partitions and abutting the interior wall of the bowl, and the inner peripheries of said intermediate partitions extending beyond the others and terminating at a suitable distance from the feed-tube to provide a central passage for the cream or lighter separated liquid; substantially as described.

6. In a centrifugal separator, a rotatable bowl, a central feed-tube therein, and a series of superimposed annular partitions encircling said tube and arranged within the liquid-space across the radial lines of the bowl, alternate partitions of the series being of substantially equal diameters and overlapping the intermediate partitions at the peripheral portion of the bowl, and the said intermediate partitions being also of substantially equal diameters and overlapping the others at the central portion of the bowl; substantially as described.

7. In a centrifugal separator, a rotatable bowl, a central feed-tube therein, and a series of superimposed conical partitions encircling said tube and arranged with their apexes uppermost, the bases of alternate partitions overlapping intermediate partitions and adjoining the inner wall of the bowl, and the apexes of the intermediate partitions overlapping said alternate partitions and terminating a suitable distance from the feed-tube; substantially as described.

8. In a centrifugal separator, a rotatable bowl, a central feed-tube therein having a discharge-opening at the bottom, a conical member surrounding the lower portion of said tube and having its base slightly separated from the bottom of the bowl, a series of conical partitions superimposed above said member having their bases adjacent the inner walls of the bowl and their central openings of suitable size to leave a central passage for the cream or lighter separated liquid, and the intervening passages between said partitions having communication at alternate adjacent ends, whereby the flow of liquid is directed alternately from and toward the center in a generally ascending thin layer; substantially as described.

9. In a centrifugal separator, a rotatable bowl, a central feed-tube therein having a discharge-opening at the bottom, a conical member around the lower portion of said tube having its base slightly separated from the bottom of the bowl, and a series of conical partitions superimposed above said member and slightly separated, alternate partitions of the series having their bases overlapping the intermediate partitions and adjoining the inner wall of the bowl, and the said intermediate partitions having their central openings overlapping the others and terminating a suitable distance from the feed-tube; substantially as described.

10. The combination with the rotating bowl or drum provided with a centrally-disposed inlet-tube having a base portion covering nearly the entire bottom surface of the bowl, of a series of inclined partitions arranged above said base and having central openings around said tube and alternately-overlapping outer terminals adjacent to the interior wall of the bowl, thereby forming a zigzag upwardly and downwardly inclined passage for the liquid, and outlet-passages for the heavier and lighter products of the separation; substantially as described.

11. In combination with the centrally-disposed inlet-tube having a conical base portion covering nearly the entire bottom of the bowl, so as to provide a narrow flow-passage between the same and said bottom, a series of inclined annular partitions arranged one above another, each alternate partition having its outer periphery extended beyond and overlapping the periphery of the next adjacent partition, while the inner or reduced end of the latter extends beyond and overlaps the inner or reduced end of the first-mentioned partition; substantially as described.

12. In combination with the rotating bowl and centrally-disposed inlet-tube, a series of conical division-plates having peripheral flanges each provided with an offset portion to receive a correspondingly-shaped annular flange on the superposed conical partition next thereto in the series, so as to bind and hold said plates together; substantially as described.

13. In combination with the rotating bowl and centrally-disposed inlet-tube, a series of conical partitions having their outer peripheral portions tightly fitting the interior wall of said bowl so as to close the spaces between said plates at the peripheries thereof, and a series of conical partitions interposed between the first-mentioned series having a bearing upon said central tube, and spacing projections between said partitions, whereby the double series of partitions provide a narrow flow-passage compelling a return of the flowing liquid toward the center as it passes each alternate partition; substantially as described.

14. In combination with the rotating bowl and the inlet-tube, a series of conical partitions each having a flange on its periphery provided with an offset therein to receive a depending flange on the next adjacent superposed conical partition in the series, whereby the entire series are bound together by frictional engagement of their peripheral portions, while the space between the peripheries of each pair is closed; substantially as described.

15. In combination with the rotating bowl and inlet-tube, a series of conical partitions each having a flange on its periphery provided with an offset therein to receive a depending flange on the next adjacent superposed partition in the series, whereby the entire series are bound together by frictional engagement of their peripheral portions, and the space between the peripheries of each pair is closed, together with a series of intermediate conical partitions having a bearing at their reduced ends upon said central tube, and having their outer peripheral portions terminating a short distance from the outer peripheries of the first-mentioned series; substantially as described.

16. In a centrifugal separator, a series of superposed conical partitions, alternate ones of which are removably secured together by frictional contact at their peripheries and the intermediate ones of which are slightly separated from adjacent alternate partitions by means of projections between said partitions; substantially as described.

17. In a centrifugal separator, a series of conical partitions arranged in the liquid-separating space of the bowl and removably bound together by frictional engagement at their peripheries; substantially as described.

18. In a centrifugal separator, a series of annular partitions alternate ones of which are detachably secured together by frictional contact at their peripheries and the intermediate ones of which are provided with peripheral projections engaging recesses in the peripheral portions of said alternate partitions; substantially as described.

19. In combination with the separating-bowl, and the inlet-tube, a series of conical partitions arranged with their apexes uppermost, each having a bearing at its base against the inner wall of the bowl, a series of similar interposed partitions having their outer peripheries overlapped by the first-mentioned partitions and each having a bearing at its apex upon the tube, and means for holding said partitions slightly apart; substantially as described.

20. In a centrifugal separator, a rotatable bowl, a central feed-tube, and an interiorly-arranged series of superimposed annular partitions slightly separated to provide shallow passages between them, said passages extending from the periphery of the bowl to the feed-tube and having communication at alternate adjacent ends, whereby the incoming liquid is caused to flow alternately from and toward the center in a gradually-ascending thin layer; substantially as described.

21. In a centrifugal separator, rotatable bowl, a central feed-tube, and an interiorly-arranged series of parallel superimposed annular partitions having central openings around the feed-tube to provide a cream-passage, alternate partitions of the series overlapping the intermediate partitions at the peripheral portion of the bowl and said intermediate partitions overlapping the others at the central portion; substantially as and for the purposes described.

In testimony whereof I affix my signature in presence of two witnesses.

HENRY B. KEIPER.

Witnesses:
M. G. SWAN,
J. GUY ESHLEMAN.